United States Patent

Khan et al.

[11] Patent Number: 6,043,955
[45] Date of Patent: Mar. 28, 2000

[54] THREE PIECE SUSPENSION WITH FRAMED GIMBAL FLEXURE

[75] Inventors: Amanullah Khan; Robert Summers, both of Temecula, Calif.

[73] Assignee: Magnecomp Corp., Temecula, Calif.

[21] Appl. No.: 09/042,181

[22] Filed: Mar. 12, 1998

Related U.S. Application Data

[60] Provisional application No. 60/075,265, Feb. 19, 1998.

[51] Int. Cl.$^7$ ..................................................... G11B 5/48
[52] U.S. Cl. .......................................................... 360/104
[58] Field of Search ............................................. 360/104

[56] References Cited

U.S. PATENT DOCUMENTS

| | | | |
|---|---|---|---|
| 5,003,419 | 3/1991 | Takekado | 360/104 |
| 5,019,931 | 5/1991 | Ohwe et al. | 360/104 |
| 5,442,504 | 8/1995 | Nagase et al. | 360/104 |
| 5,473,487 | 12/1995 | Nagase | 360/104 |
| 5,608,590 | 3/1997 | Ziegler et al. | 360/104 |
| 5,625,514 | 4/1997 | Kubo et al. | 360/104 |

FOREIGN PATENT DOCUMENTS 0 599 699 A2  8/1993  European Pat. Off. .

*Primary Examiner*—Jefferson Evans
*Attorney, Agent, or Firm*—Louis J. Bachand

[57] ABSTRACT

A disk drive suspension has a noncantilevered flexure adapted to rotate about a dimple, the flexure comprising an open frame fastened by opposed tabs to a load beam, the flexure having a gimbal panel carrying the slider and connected fore and aft to the open frame for gimbaling response to slider movement providing the ease of manufacturing of an integrated flexure with the responsiveness of a dimple-type suspension.

17 Claims, 1 Drawing Sheet

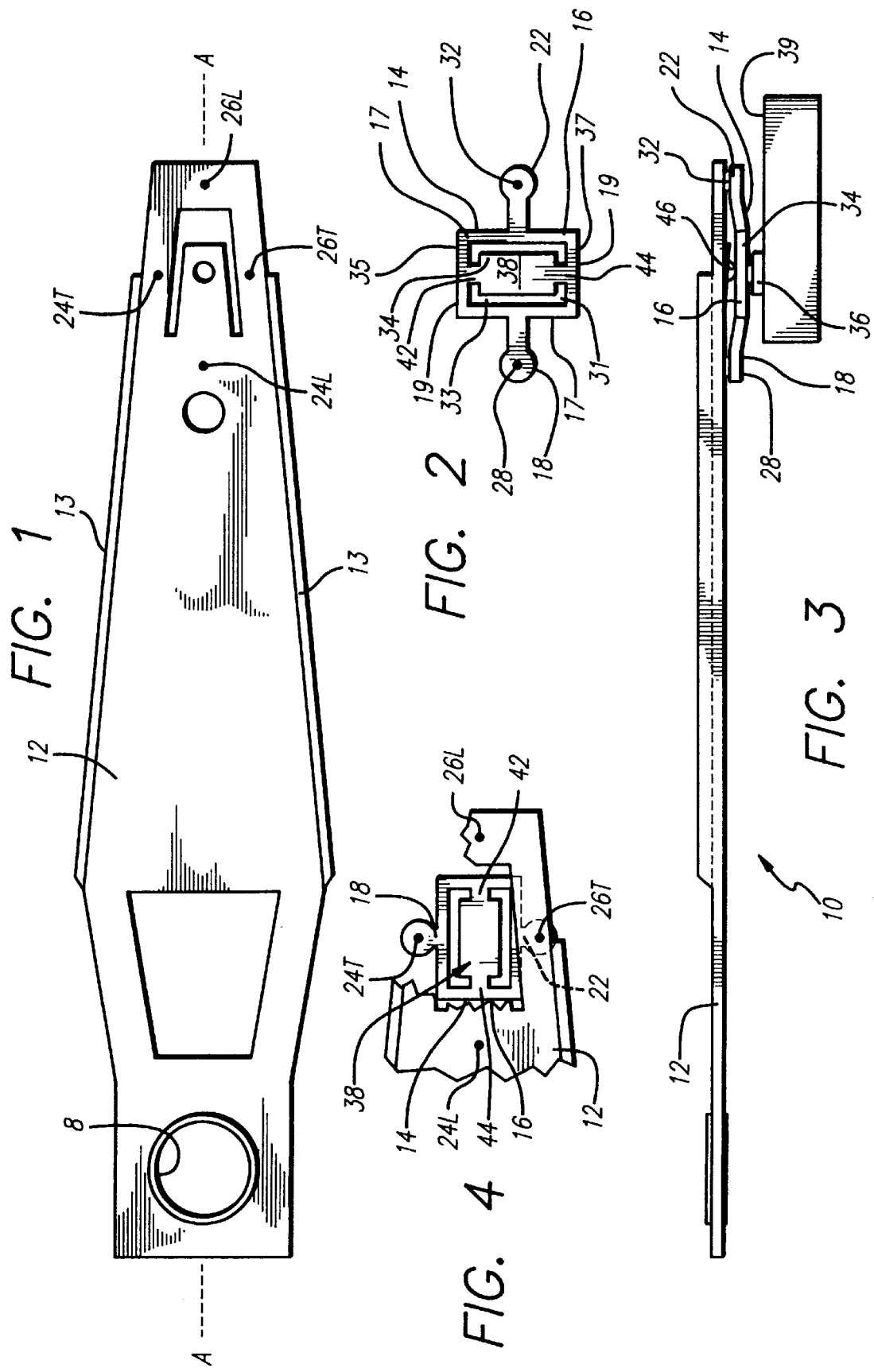

6,043,955

THREE PIECE SUSPENSION WITH FRAMED GIMBAL FLEXURE

REFERENCE TO RELATED APPLICATIONS

This application claims the benefit of U.S. Provisional Application Ser. No. 60/075,265, filed on Feb. 19, 1998.

BACKGROUND OF THE INVENTION

1. Field of the Invention

This invention relates to disk drive suspensions, and more particularly to a novel disk drive suspension that is readily fabricated with desired pitch and roll stiffness properties, is improved in non-operating shock performance by eschewing cantilever support of the flexure in favor of, supporting the flexure in two locations, and uses a dimple to apply load beam force to the flexure.

2. Related Art

Disk drive suspensions have an extended member or load beam that serves to apply a vertical force on a flexure and slider combination to maintain the slider in a desired position relative to a disk surface. The flexure serves specifically to provide the desired rotational capability to the slider by gimballing about a locus, so that the slider can react to the moving disk surface. The flexure is welded to the load beam to form the flexure. The slider is attached to the flexure and the assembly may be referred to as a three-piece suspension. The vertical force from the spring of the load beam is applied to the slider through a dimple engaging the flexure, or if the dimple is formed on the flexure, engaging the load beam.

In known three piece suspensions, the suspension has a flexure in the form of a cantilever beam. This arrangement is poor against non-operating shock as the slider and flexure tend to vibrate when the suspension goes through a sudden lift-off from the disk surface such as results from an experienced shock. Separation from the dimple occurs and pitch stiffness about the pitch axis is not symmetrical.

It is known to have the load beam and flexure integrated in a single web of material to form an integrated suspension. The integrated suspension does not employ a dimple, but may also vibrate. In an integrated suspension the necessary pre-load force must be transferred through the flexure members. Thus these members need to be very rigid. Rigid flexure members, however, increase the pitch and roll stiffness of the flexure. High flexure pitch and roll stiffness, in turn affects flying height of the slider over the disk surface as the drive operating tolerances accumulate. Achieving target thicknesses and thus stiffnesses is problematical in integrated suspension manufacture. Partial etching of the stainless steel web defines the integrated suspension including a thinning of the web thickness where the flexure is defined. Etching process control limitations may result in a slightly thicker or slightly thinner thickness at the flexure than desired. Thickness variations modulate the flexure stiffness. A tolerance of 0.00015 inch, for example, in achieving a nominal wall thickness of 0.001, permits a stiffness variation range for pitch and roll that could be 2.5 times the nominal value.

SUMMARY OF THE INVENTION

It is an object of the invention to provide an improved disk drive suspension. It is a further object to provide an easily fabricated suspension that has highly controllable thickness and thus stiffness parameters and does not rely on difficult to control partial etching for determining flexure thickness. Another object is to provide increased resistance to vibration in sudden lift-off events by avoiding the cantilever mounting of the suspension flexure, and blocking low frequency vibration of the slider. Another object is to provide a suspension having increased lateral stiffness through the use of multiple mounting locations for the flexure. Yet another object is to provide a non-cantilevered suspension that relies on a dimple for transfer of pre-load force and thus is thinner and less rigid than previously known suspensions of this type. A still further object is to provide a suspension of the non-cantilevered type in which the several components are separately fabricated and later joined for maximum flexibility in manufacturing operations, as well as increased precision of product. A further object is to provide reversability of pitch and roll stiffness values by reorienting the flexure position on the suspension.

These and other objects of the invention to become apparent hereinafter are realized in the present disk drive suspension comprising a load beam and a flexure, the flexure comprising an open frame separably attached to the load beam at plural spaced locations on its perimeter and a gimbaling panel adapted for carrying a slider and supported within the open frame for gimbaling response to movement of the slider.

In this and like embodiments, typically, there is further included a dimple structure between the load beam and the gimbal panel, the flexure open frame has plural fastening tabs for fastening the flexure to the load beam at multiple locations in perimetrically distributed locations, the flexure is formed of a material thinner than the load beam, the gimbaling panel is generally rectangular with opposed short sides and opposed long sides, the gimbaling panel having projecting connectors to the open frame at its the short sides for the gimbaling response of the gimbaling panel, and/or the gimbaling panel is generally rectangular and is disposed with its long axis parallel to the longitudinal axis of the load beam, or the reverse can be used where the gimbaling panel is disposed with is long axis transverse to the longitudinal axis of the load beam.

In a particularly preferred embodiment, typically, the load beam forms the dimple, the flexure open frame is generally rectangular and has plural fastening tabs along its long sides for fastening the flexure to the load beam at generally opposed locations, the gimbaling panel is generally rectangular with opposed short sides and opposed long sides and generally congruent with the open frame, the gimbaling panel having projecting connectors to the open frame at its the short sides for the gimbaling response of the gimbaling panel, the gimbaling panel connectors extending normal to the open frame fastening tabs, the flexure frame and gimbal panel are in a common plane spaced from the plane of the load beam by a distance substantially equal to the height of the dimple, the frame fasteners being angled from the frame to the load beam, the gimbaling panel is disposed with its long axis parallel to the longitudinal axis of the load beam, or the gimbaling panel disposed with is long axis transverse to the longitudinal axis of the load beam, and/or the flexure is formed of a material thinner than the load beam.

In a more particularly preferred embodiment, the invention provides a disk drive suspension comprising a load beam and a separably attached flexure in a different plane from the load beam, the flexure comprising a generally rectangular gimbaling panel having end connectors and supporting a slider, and an open frame having fastening tabs fastening the flexure to the load beam, the open frame being spaced from the gimbal panel across a gap and attached to the panel across the gap by the end connectors, the connectors being sufficiently flexible for gimbaling response of the gimbal panel to slider movement.

In this and like embodiments, typically, the load beam defines a dimple in contact with the gimbaling panel, the gimbaling panel has opposed short sides and opposed long sides and is generally congruent with the open frame, the gimbaling panel end connectors extend from the gimbaling panel short sides to the open frame for the gimbaling response of the gimbaling panel to slider movement, the gimbaling panel connectors extending normal to the open frame fastening tabs, the load beam defines a dimple, the flexure frame and gimbal panel are in a common plane spaced from the plane of the load beam by a distance substantially equal to the height of the dimple, the frame fasteners being angled from the frame to engage the load beam, the gimbaling panel is disposed with its long axis parallel or transverse to the longitudinal axis of the load beam, and the flexure is formed of a stainless steel material thinner than the load beam.

BRIEF DESCRIPTION OF THE DRAWINGS

The invention will be further described as to an illustrative embodiment in conjunction with the attached drawings in which:

FIG. 1 is a top plan view of the invention suspension load beam;

FIG. 2 is a top plan view of the suspension flexure;

FIG. 3 is a side elevation view of the suspension shown with an attached slider; and FIG. 4 is a top plan view of the invention suspension and flexure assembled in a reversed orientation.

DETAILED DESCRIPTION

As noted above, the advantages of the invention include provision of a dimple support for a weld-integrated flexure, avoidance of partial etching steps and their difficulties, reversability of pitch and roll stiffness values by reorientation of the flexure on the suspension, increased lateral stiffness through welding of the flexure in two spaced apart locations, and reduced tendency to vibrate since cantilever support is eliminated and associated low frequency vibrations are thus minimized and vibration of the slider largely reduced.

With reference now to the drawings in detail, in FIGS. 1–3 the invention disk drive suspension is shown at 10 (FIG. 3) and comprises load beam 12 having edge rails 13 and mounted on an actuator (not shown) by a mounting plate boss 8 and an attached flexure 14. The flexure 14 comprises a generally rectangular open frame 16. Open frame 16 is attached by welding or other means to be separable if need be from the load beam 12 and is not integral with or unitary with the load beam, unlike certain integrated load beam and flexure devices in which the flexure is etch-formed in the load beam as an essentially further thinned portion of the common web from which the load beam is formed.

The separable flexure open frame 16 has oppositely directed fastening tabs 18, 22 on opposite sides of the frame or otherwise perimetrically distributed, by which the frame is suitably oriented with and secured to the load beam 12 at load beam attachment points 24L, 26L for longitudinal alignment of the flexure 14 with the load beam longitudinal axis A—A, or attachment points 24T and 26T for transverse alignment of the flexure relative to the load beam longitudinal axis. The open frame fastening tabs 18, 22 having registration attachment points 28, 32 thus permit alternate separable attachment of the flexure open frame 16 to the load beam 12 at plural spaced locations, i.e., 24L and 26L or 24T and 26T for purposes to appear. Cf. FIG. 4.

Supported by the flexure open frame 16 is a gimbaling panel 34 adapted for carrying a slider 36 (FIG. 3). Gimbaling panel 34 is generally congruent with the open frame and its interior opening 31 and spaced from the frame by a gap 33. Gimbaling panel 34 comprises a flat band 38 of stainless steel or other spring steel or metal and is suitably formed from the same web as the surrounding open frame 16 to have opposed long sides 17 and opposed short sides 19. Typically, the flexure 14 is thinner than the load beam for increased flexibility. Connectors 42, 44 are defined between the flexure open frame 16 and the short sides 19 of gimbaling panel 34. Of the same material as, the frame 16 and gimbaling panel 34, and suitably formed by etching to be located at the fore and aft ends 35, 37 of the generally rectangular gimbaling panel, connectors 42, 44 are sufficiently flexible that gimbaling panel is readily able to rotate on the axis formed by the connectors under the effect of the movement of the slider 36 so as to accommodate that movement responsive the disk surface. Gimbaling pane 34 thus affords with the open frame 16 of the flexure 14 gimbaling response to movement of the slider 36 above the disk 39.

For purposes of imposing a gram-load on the slider 36 from the load beam 12, the load beam 12, or in some cases the panel 34 itself, defines a dimple 46 which projects from the load beam toward the gimbal panel and engages the panel to impose the load beam 12 force thereagainst in such manner that the panel 34 remains free for its intended gimbaling movement.

The gimbaning panel 34 and frame 16 connectors 42, 44 extend normal to tie open frame fastening tabs 18, 22, Flexure open frame 16 and gimbal panel 34 as well as their connectors typically lie in a common plane spaced from the plane of the load beam 12 by a distance substantially equal to the height of the dimple 46. Frame fastening tabs 18, 22 are angled from the open frame 16 to the load beam 12 to maintain the spacing therebetween.

In FIG. 4, wherein like number are used for like parts, the flexure 12 is shown installed with a reverse orientation, transverse to the longitudinal axis A—A of the load beam. Flexure attachment points 28, 32 are registered with and fixed to load beam attachment points 24T and 26T as shown, the flexure 14 and load beam 12 being relatively sized such that the flexure fits in the space provided by the load beam.

Among the advantages of the described suspension is the separation of flexure, fabrication from load beam fabrication. Different material stocks can be used for the load beam than for the flexure. The load beam can be any thickness required for whatever gram-force is desired without regard to complications arising from attempting to then fabricate the flexure from the same material. A dimple can be formed on the load beam as well, enabling better force exertion on the slider through the flexure. Flexure tolerances are held tighter since thinning of the flexure by difficult-to-control etch processes is not necessary. Finally, different pitch and roll stiffness properties can be realized by simply reversing the orientation of the flexure form longitudinally aligned to transversely aligned relative to the load beam longitudinal axis.

The foregoing objects are thus realized.

We claim:

1. Disk drive suspension comprising a load beam and a separately formed flexure, said load beam defining an opening at one end and having a cantilevered portion extending into said opening, said flexure being mounted across said load beam opening and in engagement with said load beam cantilevered portion, said flexure comprising an open frame extending in a plane spaced from said load beam, said frame being separably attached to said load beam beyond said load beam opening by frame fasteners angled from said frame to said load beam at plural spaced locations on said frame perimeter, said flexure further comprising a gimbal panel supported by said open frame and extending within said open frame plane, said gimbal panel being adapted for carrying a slider and for gimbaling response to movement of said slider.

2. Disk drive suspension according to claim 1, including also dimple structure between said load beam cantilevered portion and said gimbal panel.

3. Disk drive suspension according to claim 2, in which said load beam cantilevered portion forms said dimple.

4. Disk drive suspension according to claim 3, in which said flexure open frame is generally rectangular and has said frame fasteners on its long sides for fastening said flexure to said load beam at generally opposed locations.

5. Disk drive suspension according to claim 4, in which said gimbaling panel is generally rectangular with opposed short sides and opposed long sides and generally congruent with said open frame, said gimbalig panel having projecting connectors to said open frame at its said short sides for said gimbaling response of said gimbaling panel, said gimbaling panel connectors extending normal to said open frame fasteners.

6. Disk drive suspension according to claim 5, in which said gimbaling panel is disposed with its long axis parallel to the longitudinal axis of said load beam.

7. Disk drive suspension according to claim 5, in which said gimbaling panel is generally rectangular and is disposed with is long axis transverse to the longitudinal axis of said load beam.

8. Disk drive suspension according to claim 5, in which said flexure is formed of a material thinner than said load beam.

9. Disk drive suspension according to claim 1, in which said flexure is formed of a material thinner than said load beam.

10. Disk drive suspension according to claim 1, in which said gimbaling panel is generally rectangular with opposed short sides and opposed long sides, said gimbaling panel having projecting connectors to said open frame at its said short sides for said gimbaling response of said gimbaling panel.

11. Disk drive suspension according to claim 1, in which said gimbaling panel is generally rectangular and is disposed with its long axis parallel to the longitudinal axis of said load beam.

12. Disk drive suspension according to claim 1, in which said gimbaling panel is generally rectangular and is disposed with is long axis transverse to the longitudinal axis of said load beam.

13. Disk drive suspension comprising a load beam and a separably attached flexure, said load beam defining an opening at one end and having a cantilevered portion extending into said opening, said flexure comprising in a commond plane spaced from said opening an open frame and across a gap a generally rectangular gimbaling panel attachet to a slider on one side and engaged with said cantilevered portion on its opposite side, said gimbaling panel having end connectors attaching said gimbaling panel to said open frame across said gap, said open frame having fastening tabs angled to said load beam for fastening said flexure to said load beam, said end connectors being sufficiently flexible for gimbaling response of said gimbal panel to slider movement.

14. Disk drive suspension according to claim 13, in which said load beam cantilevered portion defines a dimple in contact with said gimbaling panel, said gimbaling panel having opposed short sides and opposed long sides and being generally congruent with said open frame, said gimbaling panel end connectors extending from said gimbaling panel short sides to said open frame for said gimbaling response of said gimbaling panel to slider movement, said gimbaling panel connectors extending normal to said open frame fastening tabs.

15. Disk drive suspension according to claim 14, in which said flexure frame and gimbal panel in said common plane are spaced from the plane of said load beam by a distance substantially equal to the height of said dimple.

16. Disk drive suspension according to claim 15, in which said gimbaling panel is disposed with its long axis parallel or transverse to the longitudinal axis of said load beam.

17. Disk drive suspension according to claim 16, in which said flexure is formed of a stainless steel material thinner than said load beam.

\* \* \* \* \*